US 9,578,625 B2

(12) United States Patent
Seo et al.

(10) Patent No.: US 9,578,625 B2
(45) Date of Patent: Feb. 21, 2017

(54) METHOD AND APPARATUS FOR ALLOCATING RESOURCES IN WIRELESS COMMUNICATION SYSTEM

(71) Applicant: LG ELECTRONICS INC., Seoul (KR)

(72) Inventors: Dongyoun Seo, Anyang-si (KR); Bonghoe Kim, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/381,499

(22) PCT Filed: Feb. 28, 2013

(86) PCT No.: PCT/KR2013/001665
§ 371 (c)(1),
(2) Date: Aug. 27, 2014

(87) PCT Pub. No.: WO2013/129881
PCT Pub. Date: Sep. 6, 2013

(65) Prior Publication Data
US 2015/0131546 A1    May 14, 2015

Related U.S. Application Data

(60) Provisional application No. 61/604,473, filed on Feb. 28, 2012.

(51) Int. Cl.
*H04W 4/00* (2009.01)
*H04W 72/04* (2009.01)

(52) U.S. Cl.
CPC ......... *H04W 72/04* (2013.01); *H04W 72/0453* (2013.01); *H04W 72/042* (2013.01)

(58) Field of Classification Search
CPC ..................................................... H04W 28/04
(Continued)

(56) References Cited

U.S. PATENT DOCUMENTS 8,009,623 B2 *  8/2011  Higuchi ................ H04L 1/0007
                                                   370/329
8,861,424 B2 * 10/2014  Chen ................... H04W 72/042
                                                   370/315
(Continued)

FOREIGN PATENT DOCUMENTS

EP        2077640 A2      7/2009
KR   10-2011-0052690 A    5/2011
(Continued)

OTHER PUBLICATIONS

Panasonic, "Signalling for UL non-contiguous resource allocation," 3GPP TSG-RAN WG1 Meeting #60, R1-101260, San Francisco, USA, Feb. 22-26, 2010, pp. 1-6.
(Continued)

*Primary Examiner* — Christopher R Crompton
(74) *Attorney, Agent, or Firm* — Birch, Stewart, Kolasch & Birch, LLP

(57) ABSTRACT

A method and an apparatus for allocating resources in a wireless communication system are provided. The method is characterized by dividing a system bandwidth into a multiple of a resource block group (RBG) to form subbands and transmitting allocation information for indicating allocated subbands among the subbands and resource allocation within the subbands.

7 Claims, 19 Drawing Sheets

(58) Field of Classification Search
USPC .......................................................... 370/329
See application file for complete search history.

(56) References Cited

U.S. PATENT DOCUMENTS

| | | | |
|---|---|---|---|
| 8,958,361 B2* | 2/2015 | Mazzarese | H04W 72/042 370/322 |
| 9,055,576 B2* | 6/2015 | Chen | H04W 72/042 |
| 2009/0154588 A1* | 6/2009 | Chen | H04L 1/0026 375/267 |
| 2009/0170522 A1* | 7/2009 | Tirkkonen | H04L 5/0092 455/452.1 |
| 2009/0316814 A1* | 12/2009 | Seo | H04W 72/042 375/260 |
| 2010/0027502 A1 | 2/2010 | Chen et al. | |
| 2010/0034157 A1 | 2/2010 | Stolyar et al. | |
| 2010/0118807 A1* | 5/2010 | Seo | H04W 72/042 370/329 |
| 2010/0157913 A1* | 6/2010 | Nagata | H04W 72/1226 370/329 |
| 2010/0232373 A1* | 9/2010 | Nory | H04W 72/1289 370/329 |
| 2010/0312894 A1* | 12/2010 | Awad | H04W 72/042 709/226 |
| 2011/0051672 A1* | 3/2011 | Lee | H04L 5/0007 370/329 |
| 2011/0200004 A1* | 8/2011 | Nakashima | H04J 13/0062 370/330 |
| 2011/0222489 A1 | 9/2011 | Awad | |
| 2011/0230219 A1* | 9/2011 | Shores | H04L 5/0037 455/507 |
| 2012/0014330 A1* | 1/2012 | Damnjanovic | H04L 5/001 370/329 |
| 2012/0147846 A1* | 6/2012 | Ho | H04W 72/042 370/330 |
| 2013/0010685 A1* | 1/2013 | Kim | H03M 13/271 370/315 |
| 2013/0083750 A1* | 4/2013 | Nazar | H04L 5/0055 370/329 |
| 2013/0176952 A1* | 7/2013 | Shin | H04W 72/042 370/329 |

FOREIGN PATENT DOCUMENTS

| | | |
|---|---|---|
| KR | 10-2012-0016136 A | 2/2012 |
| WO | WO 2009/120827 A1 | 10/2009 |
| WO | WO 2010/015719 A1 | 2/2010 |
| WO | WO 2010/132386 A2 | 11/2010 |
| WO | WO 2011/159132 * | 12/2011 |

OTHER PUBLICATIONS

ZTE, "Uplink Non-contiguous Resource Allocation for LTE-Advanced," 3GPP TSG RAN WG1 Meeting #60, R1-100965, San Francisco, US, Feb. 22-26, 2010, pp. 1-8.

* cited by examiner

| PRB index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| subset# | 0 | 0 | 0 | 1 | 1 | 1 | 2 | 2 | 2 | 0 | 0 | 0 | 1 | 1 | 1 | 2 | 2 | 2 | 0 | 0 | 0 | 1 | 1 | 2 | 2 | 2 | 0 | 0 | 0 | 1 | 1 | 1 | 2 | 2 | 2 | 0 | 0 | 0 | 1 | 1 | 1 | 2 | 2 | 2 | 0 | 0 | 0 | 1 | 1 |
| 1st slot | 0 | 4 | 8 | 12 | 16 | 20 | 24 | 28 | 32 | 36 | 40 | 44 | 1 | 5 | 9 | 13 | 17 | 21 | 25 | 29 | 33 | 37 | 41 | -1 | -1 | -1 | 2 | 6 | 10 | 14 | 18 | 22 | 26 | 30 | 34 | 38 | 42 | 45 | 3 | 7 | 11 | 15 | 19 | 23 | 27 | 31 | 35 | 39 | 43 |
| 2nd slot | 2 | 6 | 10 | 14 | 18 | 22 | 26 | 30 | 34 | 38 | 42 | 45 | 3 | 7 | 11 | 15 | 19 | 23 | 27 | 31 | 35 | 39 | 43 | -1 | -1 | -1 | 0 | 4 | 8 | 12 | 16 | 20 | 24 | 28 | 32 | 36 | 40 | 44 | 1 | 5 | 9 | 13 | 17 | 21 | 25 | 29 | 33 | 37 | 41 |

Subband 0 | Subband 1

System BW = 50RBs

METHOD AND APPARATUS FOR ALLOCATING RESOURCES IN WIRELESS COMMUNICATION SYSTEM

CROSS REFERENCE TO RELATED APPLICATIONS

This application is the National Phase of PCT International Application No. PCT/KR2013/001665, filed on Feb. 28, 2013, which claims priority under 35 U.S.C. 119(e) to U.S. Provisional Application No. 61/604,473, filed on Feb. 28, 2012, all of which are hereby expressly incorporated by reference into the present application.

BACKGROUND OF THE INVENTION

Field of the Invention

The present invention relates to wireless communication and, more particularly, to a method and apparatus for allocating resources in a wireless communication system.

Related Art

3rd Generation Partnership Project (3GPP) Long Term Evolution (hereinafter referred to as LTE) is a wireless communication system standard. In LTE, when resources are allocated to a terminal, a Resource Block (RB) or a Resource Block Group (RBG) is used as a resource allocation unit. An RB consists of 7 or 6 Orthogonal Frequency Division Multiplexing (OFDM) symbols contiguous in a time domain and 12 subcarriers in a frequency domain. The number of RBs included in an RBG is determined by a system band. Furthermore, if a Distributed Virtual Resource Block (DVRB) method of distributing and allocating RBs is used, required parameters are also determined based on a system band.

Meanwhile, in the future wireless communication system, such a conventional resource allocation method may not be identically used. For example, 3GPP Long Term Evolution-Advanced (hereinafter referred to as LTE-A) is the next-generation wireless communication system standard improved from LTE. In LTE-A, a low-price/low-specification terminal chiefly performing data communication, such as the metering of a meter, the measurement of a water level, the utilization of a surveillance camera, and a report on the inventory of a vending machine, may be supported. A low-price/low-specification terminal chiefly performing communication for a small amount of data as described above is called a Machine Type Communication (MTC) device. In the case of an MTC device, it may be sufficient if only part of a system band has only to be allocated because the amount of data transmitted is small.

If only part of a system band is allocated to a specific terminal, such as an MTC device, there is a need for a resource allocation method in which how the system band will be efficiently allocated is considered and an apparatus using such a method.

SUMMARY OF THE INVENTION

The present invention provides a resource allocation method and apparatus in a wireless communication system.

In an aspect, a method of allocating radio resources in a wireless communication system includes configuring subbands by dividing a system band in a multiple of a Resource Block Group (RBG) and sending allocation information indicative of an allocated subband of the subbands and resource allocation within the allocated subband.

In another aspect, an apparatus for allocating radio resources in a wireless communication system a includes a Radio Frequency (RF) unit sending and receiving radio signals and a processor connected to the RF unit, wherein the processor configures subbands by dividing a system band in a multiple of a Resource Block Group (RBG) and sends allocation information indicative of an allocated subband of the subbands and resource allocation within the allocated subband.

Although UE using the entire system band and UE using only part of the system band are mixed, resource allocation can be efficiently performed.

BRIEF DESCRIPTION OF THE DRAWINGS

FIG. 14 illustrates an example in which the band of subband is allocated in multiples of 2 of an RBG size.

FIG. 15 illustrates an example in which the bands of subbands are allocated in the square of an RBG size.

FIG. 17 illustrates an example in which the bands of subbands are allocated based on a first gap Ngap, 1.

DESCRIPTION OF EXEMPLARY EMBODIMENTS

Long Term Evolution (LTE) according to the 3$^{rd}$ Generation Partnership Project (3GPP) standardization organization is part of Evolved-UMTS (E-UMTS) using an Evolved-Universal Terrestrial Radio Access Network (E-UTRAN), and LTE adopts Orthogonal Frequency Division Multiple Access (OFDMA) in downlink and adopts Single Carrier-Frequency Division Multiple Access (SC-FDMA) in uplink. LTE-Advanced (A) is the evolution of LTE. In order to clarify a description hereinafter, 3GPP LTE/LTE-A are chiefly described, but the technical spirit of the present invention is not limited thereto.

A wireless communication system includes at least a single Base Station (BS). Each BS provides communication service to a specific geographical area. In general, a BS refers to a fixed station that communicates with user equipment, and the BS may also be called another term, such as an evolved NodeB (eNB), a Base Transceiver System (BTS), an access point, or an Access Network (AN).

User Equipment (UE) may be fixed or mobile and may also be called another term, such as a Mobile Station (MS), a User Terminal (UT), a Subscriber Station (SS), a wireless device, a Personal Digital Assistant (PDA), a wireless modem, a handheld device, or an Access Terminal (AT).

Hereinafter, downlink (DL) refers to communication from a BS to UE, and uplink (UL) refers to communication from UE to a BS.

A wireless communication system may be a system supporting bidirectional communication. Bidirectional communication may be performed using Time Division Duplex (TDD) mode, Frequency Division Duplex (FDD) mode, etc. In TDD mode, different time resources are used in UL transmission and DL transmission. In FDD mode, different frequency resources are used in UL transmission and DL transmission. A BS and UE may communicate with each other using radio resources called a radio frame.

Figure 1:
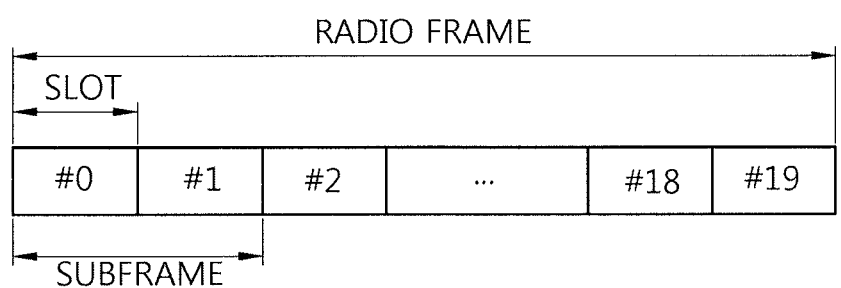
FIG. 1 illustrates the structure of a radio frame.

FIG. 1 illustrates the structure of a radio frame.

Referring to FIG. 1, the radio frame (may also be abbreviated as a frame) includes 10 subframes in a time domain, and a single subframe includes two slots. The length of a single subframe may be 1 ms, and the length of a single slot may be 0.5 ms. The time taken to send a single subframe is called a Transmission Time Interval (TTI). The TTI may be a minimum unit for scheduling.

A single slot may include a plurality of Orthogonal Frequency Division Multiplexing (OFDM) symbols in the time domain. One symbol period is represented by an OFDM symbol because OFDMA is used in downlink in 3GPP LTE. An OFDMA symbol may be called another term depending on a multiple access scheme. For example, if SC-FDMA is used as an uplink multiple access scheme, a corresponding symbol may be called an SC-FDMA symbol. One slot has been illustrated as including 7 OFDM symbols, but the number of OFDM symbols included in a single slot may be changed depending on the length of a Cyclic Prefix (CP). In accordance with 3GPP TS 36.211 V8.5.0 (2008-12), 1 subframe includes 7 OFDM symbols in a normal CP, and 1 subframe includes 6 OFDM symbols in an extended CP. The structure of the radio frame is only an example, and the number of subframes included in the radio frame and the number of slots included in a subframe may be changed in various ways.

Figure 2:
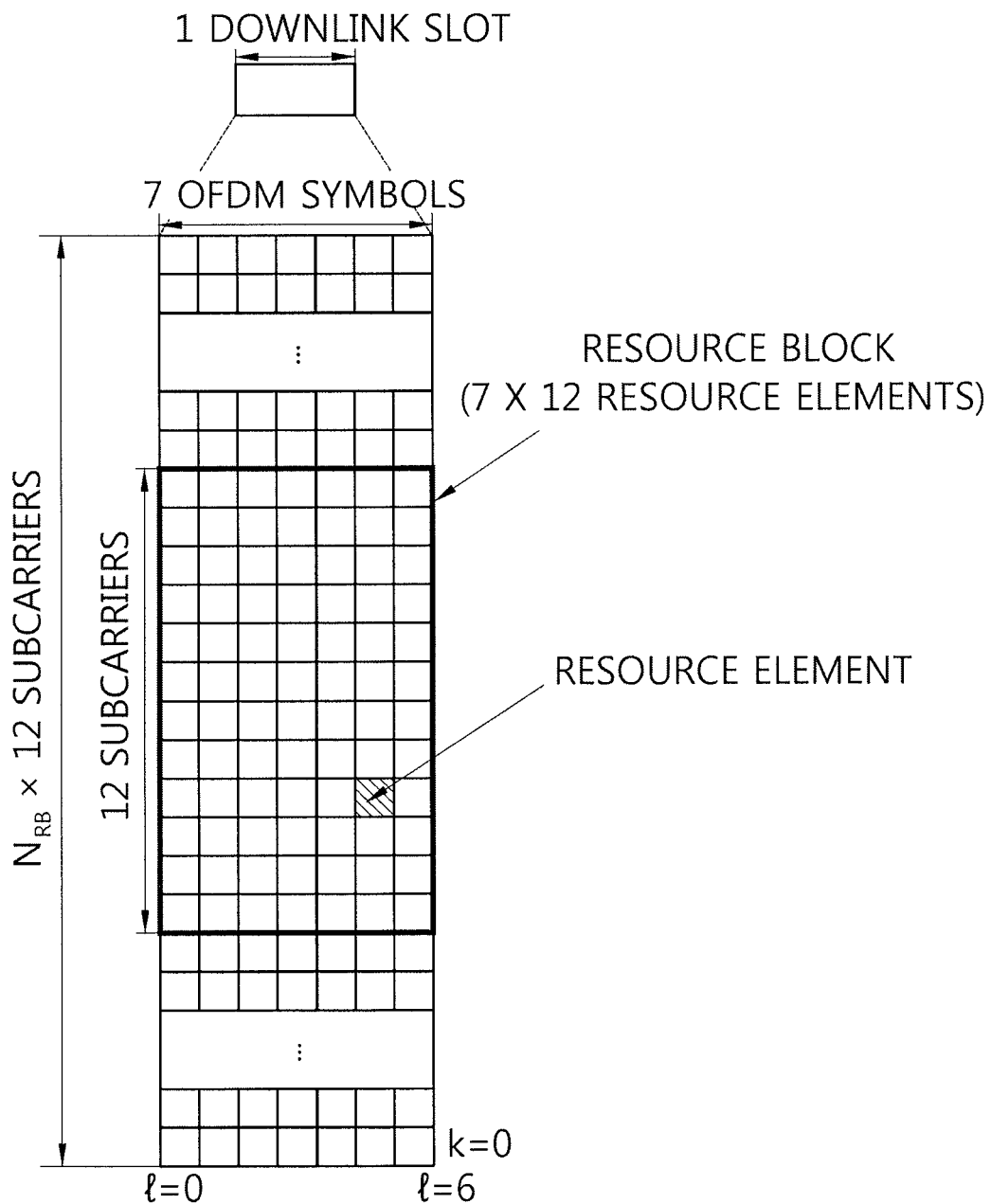
FIG. 2 illustrates an example of the resource grid of a single downlink slot.

FIG. 2 illustrates an example of the resource grid of a single downlink slot.

Referring to FIG. 2, the downlink slot includes a plurality of OFDM symbols in a time domain and includes $N_{RB}$ Resource Blocks (RBs) in a frequency domain. An RB is a resource assignment unit, and the RB includes a single slot in the time domain and includes a plurality of contiguous subcarriers in the frequency domain. The number of RBs $N_{RB}$ included in a downlink slot depends on a downlink transmission bandwidth that is configured in a cell. For example, in an LTE system, $N_{RB}$ may be any one of 6 to 110. An uplink slot may have the same structure as the downlink slot. An uplink slot or a downlink slot may be abbreviated as a slot.

Each of elements on the resource grid is called a Resource Element (RE). An RE on a resource grid may be identified by an index pair (k, l) within a slot. In this case, k (k=0, $N_{RB} \times 12-1$) indicates a subcarrier index in the frequency domain, and l (l=0, . . . , 6) indicates an OFDM symbol index in the time domain.

In FIG. 2, a single RB has been illustrated as including 7×12 REs, including 7 OFDM symbols in the time domain and 12 subcarriers in the frequency domain, but the number of OFDM symbols and the number of subcarriers within an RB are not limited thereto. The number of OFDM symbols and the number of subcarriers may be changed in various ways depending on the length of a CP, frequency spacing, etc. For example, a single of 128, 256, 512, 1024, 1536, and 2048 may be selected and used as the number of subcarriers in a single OFDM symbol.

Figure 3:
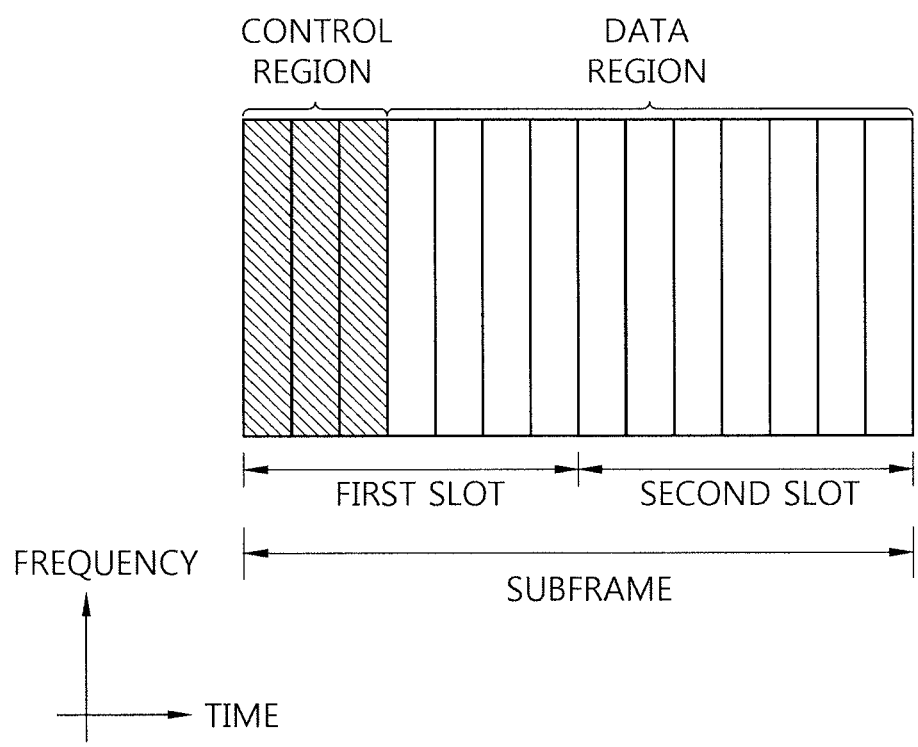
FIG. 3 illustrates an example of the structure of a downlink subframe in 3GPP LTE.

FIG. 3 illustrates an example of the structure of a downlink subframe in 3GPP LTE. The subframe includes two contiguous slots. A maximum of 3 former OFDM symbols in a first slot within the downlink subframe are a control region to which control channels are assigned, and the remaining OFDM symbols are a data region to which data channels are assigned. In this case, the control region has been illustrated as including 3 OFDM symbols, but this is only illustrative.

Control channels, such a Physical Downlink Control Channel (PDCCH), a Physical Control Format Indicator Channel (PCFICH), and a Physical Hybrid ARQ Indicator Channel (PHICH), may be assigned to the control region. UE may read data transmitted through a data channel by decoding control information transmitted through a PDCCH. The number of OFDM symbols included in the control region within a subframe may be aware through a PCFICH. A PHICH carries a Hybrid Automatic Repeat Request (HARQ) Acknowledgement (ACK)/NOT-Acknowledgement (NACK) signal in response to UL transmission. Physical Downlink Shared Channels (PDSCHs) may be assigned to the data region.

Control information transmitted through a PDCCH is called Downlink Control Information (DCI). Uplink scheduling information (called an UL grant), downlink scheduling information (called a DL grant), an UL power control command, control information for paging, control information for indicating a random access response (RACH response), and so on are transmitted on DCI.

DCI may be transmitted with a specific format, and the use of DCI may be determined depending on each DCI format. For example, the uses of DCI formats may be classified as in the following table.

TABLE 1

| DCI FORMAT | USES |
| --- | --- |
| DCI format 0 | Used for PUSCH scheduling |
| DCI format 1 | Used for the scheduling of a single PDSCH codeword |
| DCI format 1A | Used for compact scheduling and a random access process for a single PDSCH codeword |
| DCI format 1B | Used for the compact scheduling of a single PDSCH codeword having precoding information |
| DCI format 1C | Used for the very compact scheduling of a single PDSCH codeword |
| DCI format 1D | Used for the precoding and compact scheduling of a single PDSCH codeword having power offset information |
| DCI format 2 | Used for the PDSCH scheduling of MSs set in closed-loop spatial multiplexing mode |
| DCI format 2A | Used for the PDSCH scheduling set in open-loop spatial multiplexing mode |

TABLE 1-continued

| DCI FORMAT | USES |
| --- | --- |
| DCI format 3 | Used to send a TPC command for a PUCCH and a PUSCH having 2-bit power adjustments |
| DCI format 3A | Used to send a TPC command for a PUCCH and a PUSCH having 1-bit power adjustment |
| DCI format 4 | Used to schedule a PUSCH in a single UL cell in a multi-antenna transmission mode |

A PDCCH may be generated through the following process. A BS adds a Cyclic Redundancy Check (CRC) for error detection to DCI to be transmitted to UE. An identifier (called a Radio Network Temporary Identifier (RNTI)) is masked to the CRC depending on the owner or use of a PDCCH. In the case of a PDCCH for specific UE, an identifier unique to the UE that is assigned by a BS, for example, a Cell-RNTI (C-RNTI) may be masked to the CRC. In the case of a PDCCH for a paging message transmitted through a paging channel (PCH), a paging identifier, for example, a Paging-RNTI (P-RNTI) may be masked to the CRC. In the case of a PDCCH for system information transmitted through a DL-SCH, a system information identifier, for example, a System Information-RNTI (SI-RNTI) may be masked to the CRC. In the case of a PDCCH for denoting a random access response, that is, a response to the transmission of a random access preamble by UE, a Random Access-RNTI (RA-RNTI) may be masked to the CRC. If C-RNTI series (including an SPS C-RNTI, a temporary C-RNTI, etc.) are used, a PDCCH carries control information for corresponding specific UE. If other RNTIs are used, a PDCCH carries common control information received by all MSs within a cell.

Thereafter, coded data is generated by performing channel coding on control information to which a CRC has been added. Next, rate matching according to a CCE aggregation level that has been assigned to the PDCCH format is performed. Next, modulation symbols are generated by modulating the coded data. The number of modulation symbols that form a single CCE may vary depending on the CCE aggregation level (one of 1, 2, 4, and 8). The modulation symbols are mapped (CCE to RE mapped) to a physical RE.

In 3GPP LTE, UE uses blind decoding in order to detect a PDCCH. Blind decoding is a method of checking whether or not a corresponding PDCCH is for its control channel by checking an CRC error by demasking a desired identifier from the Cyclic Redundancy Check (CRC) of a received PDCCH (this is called a PDCCH candidate). The reason why UE performs blind decoding is that the UE is unaware that its own PDCCH is transmitted at which position within a control region using what CCE aggregation level or DCI format.

A plurality of PDCCHs may be transmitted within a single subframe, and UE monitors a plurality of PDCCHs every subframe. In this case, 'monitoring' means that UE attempts to decode a PDCCH depending on a PDCCH format.

In 3GPP LTE, a Search Space (SS) is used in order to reduce overhead attributable to blind decoding. The search space may be said to be a monitoring set of CCEs for a PDCCH. UE monitors a PDCCH within a corresponding SS.

The SS is divided into a Common Search Space (CSS) and a UE-specific Search Space (USS). The CSS is a space where a PDCCH having common control information is searched for, and may include 16 CCEs having CCE indices 0~15, and supports a PDCCH having a CCE aggregation level of {4, 8}. However, PDCCHs (the DCI formats 0 and 1A) that carry US-specific information may be transmitted in the CSS. The USS supports a PDCCH having a CCE aggregation level of {1, 2, 4, 8}.

The size of the search space is differently defined in the CSS and the USS. The start point of the CSS is fixed regardless of a subframe, whereas the start point of the USS may vary every subframe depending on a UE identifier (e.g., C-RNTI), a CCE aggregation level and/or a slot number within a radio frame. If the start point of the USS is present in the CSS, the USS and the CSS may be overlapped with each other.

Figure 4:
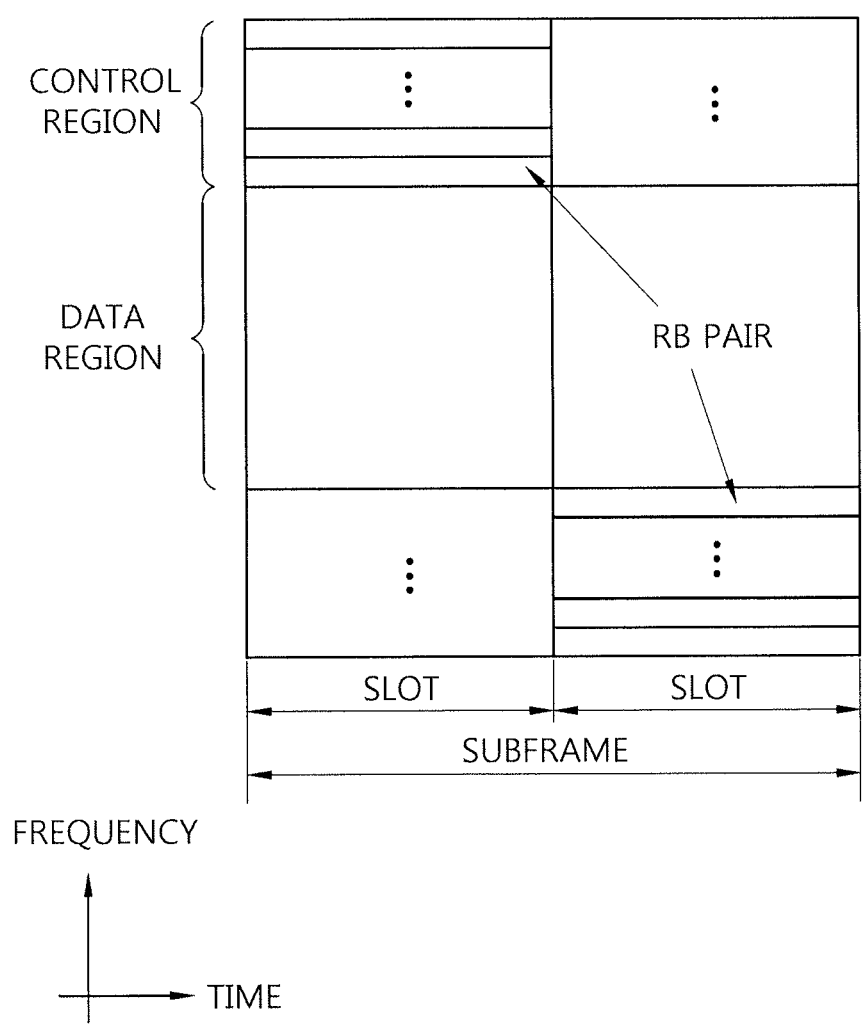
FIG. 4 illustrates the structure of an uplink subframe.

FIG. 4 illustrates the structure of an uplink subframe.

Referring to FIG. 4, the uplink subframe may be divided into a control region and a data region in the frequency domain. A physical uplink control channel (PUCCH) on which uplink control information is transmitted is assigned to the control region. A physical uplink shared channel (PUSCH) on which data (control information may also be transmitted according to circumstances) is transmitted is assigned to the data region. UE may transmit a PUCCH and a PUSCH at the same time or may transmit only one of a PUCCH and a PUSCH depending on a configuration.

A PUCCH for a single MS is assigned in the form of a RB pair (RB pair) in the subframe. Resource blocks that belong to the RB pair occupy different subcarriers in a first slot and a second slot. A frequency that is occupied by the RBs belonging to the RB pair to which a PUCCH is assigned is changed on the basis of a slot boundary. This is said that the RB pair assigned to the PUCCH has been subjected to frequency-hopped at the slot boundary. A frequency diversity gain may be obtained by sending uplink control information through different subcarriers over time.

Hybrid Automatic Repeat reQuest (HARQ) acknowledgement (ACK)/non-acknowledgement (NACK), and Channel Status Information (CSI) indicative of a downlink channel state, for example, a Channel Quality Indicator (CQI), a Precoding Matrix Index (PMI), a Precoding Type Indicator (PTI), and a Rank Indication (RI) may be transmitted on a PUCCH. Periodic CSI may be transmitted through a PUCCH.

A PUSCH is mapped to an Uplink Shared Channel (UL-SCH), that is, a transport channel. Uplink data transmitted on the PUSCH may be a transport block, that is, a data block for the UL-SCH transmitted during a TTI. The transport block may include user data. Alternatively, the uplink data may be multiplexed data. The multiplexed data may be the multiplexing of the transport block for the UL-SCH and CSI. For example, the CSI multiplexed into data may be a CQI, a PMI, or an RI. Alternatively, the uplink data may include only CSI. Periodic or aperiodic CSI may be transmitted through a PUSCH.

A carrier aggregation system is described below.

Figure 5:
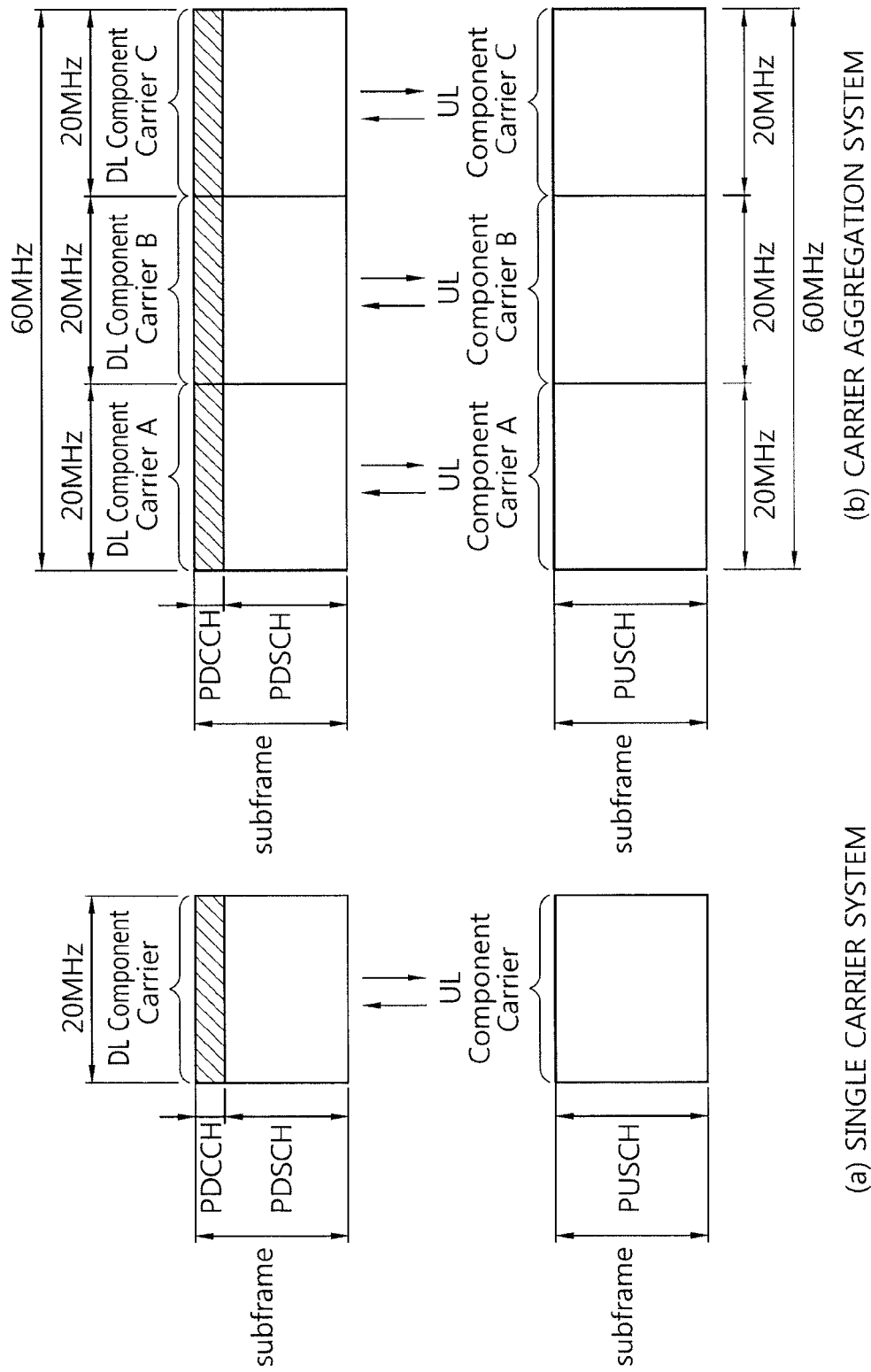
FIG. 5 is an example of a comparison between an existing single carrier system and a carrier aggregation system.

FIG. 5 is an example of a comparison between an existing single carrier system and a carrier aggregation system.

Referring to FIG. 5, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and a CC may be abbreviated as a carrier. For example, in order to assign a bandwidth of 60 MHz to UE, 3 CCs each having 20 MHz may be assigned to the UE.

A CC, that is, a target when aggregating a single or more CCs, may use bandwidths used in an existing system for the purpose of backward compatibility with the existing system.

For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process. In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system may support a plurality of CCs, that is, a plurality of serving cells.

Such a CA system may support cross-carrier scheduling. Cross-carrier scheduling is a scheduling method capable of performing the resource assignment of a PDSCH transmitted through another CC and/or the resource assignment of a PUSCH transmitted through CCs other than CCs that are basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

A resource allocation method according to the present invention is described below. First, an existing resource allocation method is described, and the resource allocation method according to the present invention is then described. To this end, some terms are defined.

A Resource Element (RE) is the smallest frequency-time unit to which data or the modulation symbol of a control channel is mapped. If a signal is transmitted in a single OFDM symbol through M subcarriers and N OFMD symbols are transmitted in a single subframe, M×N REs are present in a single subframe.

A Physical Resource Block (PRB) is a resource allocation unit in which data is transmitted. A single PRB includes contiguous REs in the frequency-time domain, and a number of PRBs are defined in a single subframe.

A Virtual Resource Block (VRB) is a virtual resource allocation unit for data transmission. The number of REs included in a single VRB is the same as the number of REs included in a single PRB. In data transmission, a single VRB may be mapped to a single PRB or may be mapped to some regions of a plurality of PRBs.

A Localized Virtual Resource Block (LVRB) is one type of VRB, a single LVRB is mapped to a single PRB, and PRBs to which different LVRBs are mapped are not overlapped with each other.

A Distributed Virtual Resource Block (DVRB) is one type of VRB, a single DVRB is mapped to some REs within a plurality of PRBs, and REs mapped to different DVRB are not overlapped with each other.

$N_{PRB}$ is indicative of the number of PRBs of a system. $N_{LVRB}$ is indicative of the number of available LVRBs of a system. In this case, the number of RBs may represent the number of RBs per slot. That is, in 3GPP, RBs are divided for each slot, and RBs within the two slots of a single subframe are allocated according to each RB pair. Accordingly, the allocation of an RB is described, for convenience of description, but the RB may mean an RB pair depending on an actual resource allocation method of 3GPP. $N_{DVRB}$ is indicative of the number of available DVRBs of a system. $N_{LVRB\_UE}$ is indicative of a maximum number of LVRBs allocated to a single MS. $N_{DVRB\_UE}$ is indicative of a maximum number of DVRBs allocated to a single MS. $N_{subset}$ is indicative of the number of subsets. A subset is described later.

As a simple method of signaling resource allocation, a bitmap including $N_{PRB}$ bits per UE that are scheduled in order to schedule the $N_{PRB}$ number of PRBs of a system in unit of PRB may be used. In the bitmap, each bit corresponds to a single PRB, and $N_{PRB}$ PRBs are allocated in unit of PRB. In such a method, however, overhead is increased because the number of bits of a bitmap is excessively increased if the number of PRBs of a system is great.

In 3GPP LTE, the following resource allocation types 0, 1, and 2 are provided in order to prevent the overhead of a bitmap from increasing.

The resource allocation type 0 is a method of allocating a Resource Block Group (RBG), that is, a set of contiguous PRBs, to UE through a bitmap. That is, in the resource allocation type 0, a resource allocation unit is an RBG not a single RB. The size of an RBG (indicated by P), that is, the number of RBs that forms an RBG, is dependently determined by a system band. The resource allocation type 0 is also called an RBG method.

The resource allocation type 1 is a method of allocating resources to UE in unit of a PRB within a subset through a bitmap. A subset includes a plurality of discontiguous RBGs. The resource allocation type 1 is also called a subset method.

The resource allocation type 2 includes a method of allocating contiguous PRBs and a method of allocating resources including discontiguous PRBs. The resource allocation type 2 is also called a compact method.

Hereinafter, it is assumed that, for example, a total of 32 PRBs that may be allocated to UE are present. In such a case, a method of allocating resources to the UE using the resource allocation type 0 or 1 is described.

Figure 6:
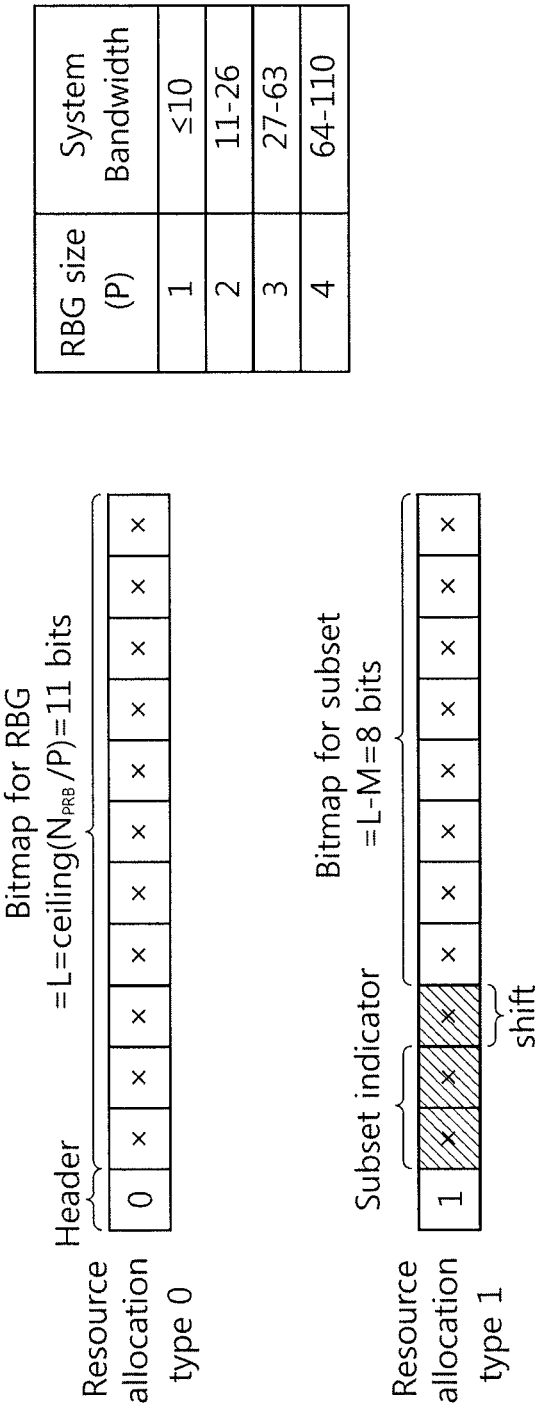
FIG. 6 illustrates bitmaps used in resource allocation types 0 and 1.
Figure 7:
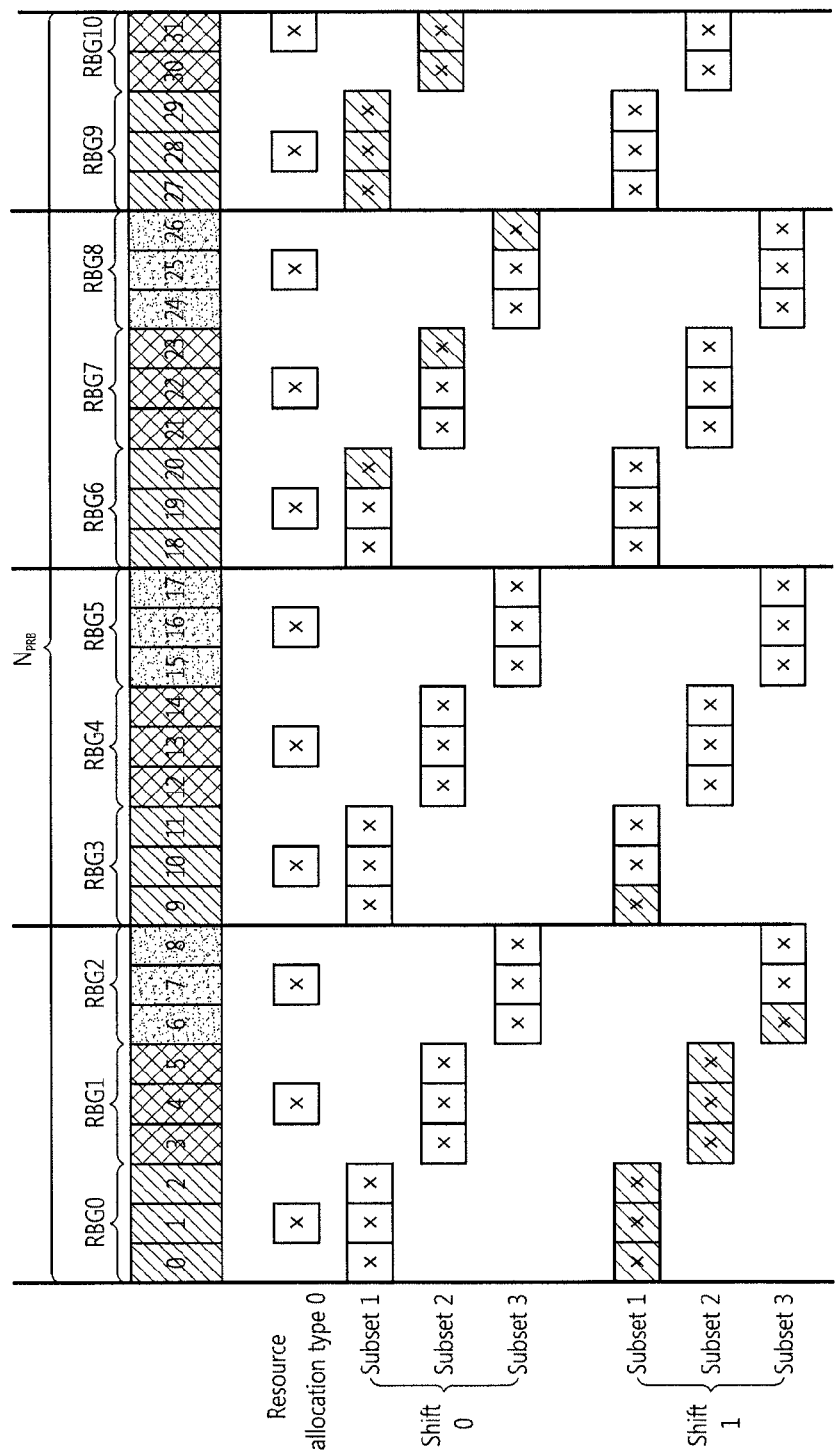
FIG. 7 illustrates resources indicated depending on the bitmaps of FIG. 6.

FIG. 6 illustrates bitmaps used in resource allocation types 0 and 1. FIG. 7 illustrates resources that may be indicated depending on the bitmaps of FIG. 6.

Referring to FIGS. 6 and 7, the bitmap consists of a total of 12 bits in order to allocate some or all of a total of 32 PRBs. The first 1 bit of the bitmap is a header and is indicative of the resource allocation type 0 (if the bit value of the header is 0) or 1 (if the bit value of the header is 1). If the header is indicative of the resource allocation type 0, a 'bitmap for an RBG' consisting of 11 bit subsequent to the header may be indicative of any one of a total of 11 RBGs. In general, the bitmap for an RBG is a ceiling ($N_{PRB}/P$) bit. Ceiling(x) is indicative of the smallest integer of numbers greater than "x".

That is, the resource allocation type 0 (the RBG method) is a method of binding some RBs to form an RB Group (RBG) and then allocating resources using an RBG as a basic unit. The density of resource allocation is different depending on an RBG size. That is, the density of resource allocation is low if an RBG size is great and is high if an RBG size is small.

The RBG size P may be defined by the number of RBs that is set in a system frequency band as in the following table.

TABLE 2

| System Bandwidth $N_{RB}^{DL}$ | RBG Size (P = $M_{RBG}$) |
|---|---|
| ≤10 | 1 |
| 11-26 | 2 |
| 27-63 | 3 |
| 64-110 | 4 |

In the example in which the number of PRBs of the system band is 32, minute resource allocation is impossible because RBs less than 3 are unable to be allocated in the resource allocation type 0. In order to supplement such a problem, 3GPP LTE provides the resource allocation type 1. The number of bits of the bitmap of the resource allocation type 1 is the same as the number of bits of the bitmap of the resource allocation type 0. However, they have different interpretations.

If the header of a bitmap is indicative of the resource allocation type 1, bits placed next to the header are interpreted as a bitmap for a subset indicator of 2 bits, a shift of 1 bit, and a subset of 8 bits.

The subset includes a plurality of RBGs. That is, as illustrated in FIG. 7, the subset includes 4 RBGs (subsets 1, 2) or 3 RBGs (a subset 3). The subset indicator is indicative of any one of a plurality of subsets. For example, in FIG. 7, the subset indicator is indicative of any one of the subsets 1, 2, and 3.

The shift of 1 bit is indicative that the bitmap for the subset of 8 bits is for which RB. For example, in FIG. 7, a shift 0 is indicative that a bitmap for a subset is for 8 PRBs having a small PRB number within the subset. In contrast, a shift 1 is indicative that a bitmap for a subset is for 8 PRBs having a great PRB number within the subset.

A bitmap for a subset indicates some of PRBs that form the subset in unit of PRB. That is, in the example, each subset includes a plurality of PRBs, and 8 PRBs of the plurality of PRBs may be represented as a bitmap for the subset. As described above, what 8 PRBs of the plurality of PRBs is indicated is indicated by a shift.

Meanwhile, if only neighbor RBs can be allocated to UE, information about the allocated RBs may be represented by the start point and number (length) of an RB. In such a case, the resource allocation type 2 may be used. More specifically, this corresponds to a method of allocating contiguous PRBs in the resource allocation type 2.

Figure 8:
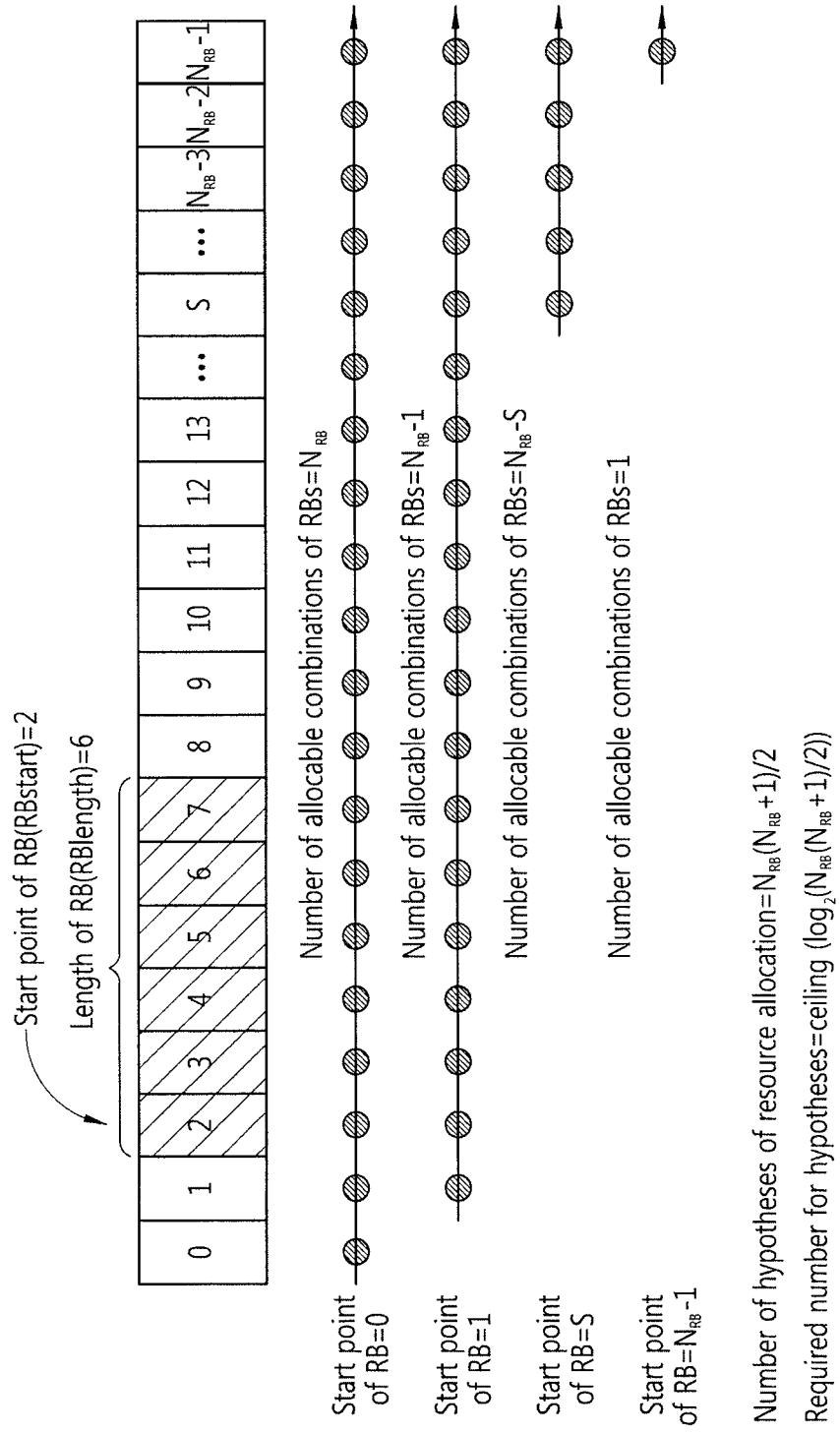
FIG. 8 illustrates resource allocation through the resource allocation type 2.

FIG. 8 illustrates resource allocation through the resource allocation type 2.

Referring to FIG. 8, a maximum number of RBs that may be allocated to UE is $N_{RB}$, and the RBs are numbered from 0 to ($N_{RB}$−1). Each of the RBs allocated to the UE may be represented by the start point 2 of the RB and the length 6 of the RB. In such a case, the number of combinations of the RBs that may be used according to each start point is different. A total number of RBGs that may be allocated is ($N_{RB}(N_{RB}+1)/2$) kinds. Accordingly, the number of bits for representing the ($N_{RB}(N_{RB}+1)/2$) kinds is ceiling ($\log_2(N_{RB}(N_{RB}+1)/2)$). Ceiling(x) or Ceil(x) is indicative of the smallest integer of numbers each equal to or greater than "x". The resource allocation type 2 is advantageous in that an increase of the number of bits according to an increase of the N number is not great compared to the resource allocation type 0, 1 in which a bitmap is used. However, the resource allocation type 2 (the compact method) is disadvantageous in that two or more discontiguous RBs are unable to be allocated.

In the resource allocation type 2, a method of allocating resources formed of discontiguous PRBs, that is, a DVRB allocation method, is described below.

If the number of RBs ($N^{DL}_{RB}$) of a system band is $6 \leq N^{DL}_{RB} \leq 49$ a single gap value $N_{gap,1}$ is defined and $N_{gap}=N_{gap,1}$. If the number of RBs ($N^{DL}_{RB}$) of a system band is $50 \leq N^{DL}_{RB} \leq 110$, two gap values $N_{gap,1}$, $N_{gap,2}$ are defined.

For example, a parameter $N_{gap}$ may be given as in the following table.

TABLE 3

| System BW | Gap ($N_{gap}$) | |
|---|---|---|
| ($N_{RB}^{DL}$) | $1^{st}$ Gap ($N_{gap,1}$) | $2^{nd}$ Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap,1}$ may be called a first gap value and is a value that maximizes diversity in all given system bands. $N_{gap,2}$ may be called a second gap value and is the value of a gap given to only a specific system band. The gap may be said to be a value indicative that DVRBs having the same index are disposed (mapped) in PRBs that are spaced apart from each other how much between a first slot and a second slot when DVRBs and PRBs are mapped. Whether $N_{gap}=N_{gap,1}$ or $N_{gap}=N_{gap,2}$ is signaled by part of downlink scheduling allocation.

DVRBs are numbered from 0 to $N^{DL}_{RB}$−1. In this case, if $N_{gap}=N_{gap,1}$, $N^{DL}_{VRB}=N^{DL}_{VRB,gap1}=2 \cdot \min(N_{gap}, N^{DL}_{RB}-N_{gap})$. If $N_{gap}=N_{gap,2}$, $N^{DL}_{VRB}=N^{DL}_{VRB,gap2}=\text{floor}(N^{DL}_{RB}/2N_{gap}) \cdot 2N_{gap}$. Floor (x) is the greatest integer of numbers each smaller than "x".

If contiguous $\tilde{N}_{VRB}^{DL}$ VRB numbers include VRB number interleaving and $N_{gap}=N_{gap,1}$, $\tilde{N}_{RB}^{DL}=N_{VRB}^{DL}$. If $N_{gap}=N_{gap,2}$, $\tilde{N}_{VRB}^{DL}=2N_{gap}$. The interleaving of the VRB numbers may be performed by an interleaver.

Figure 9:
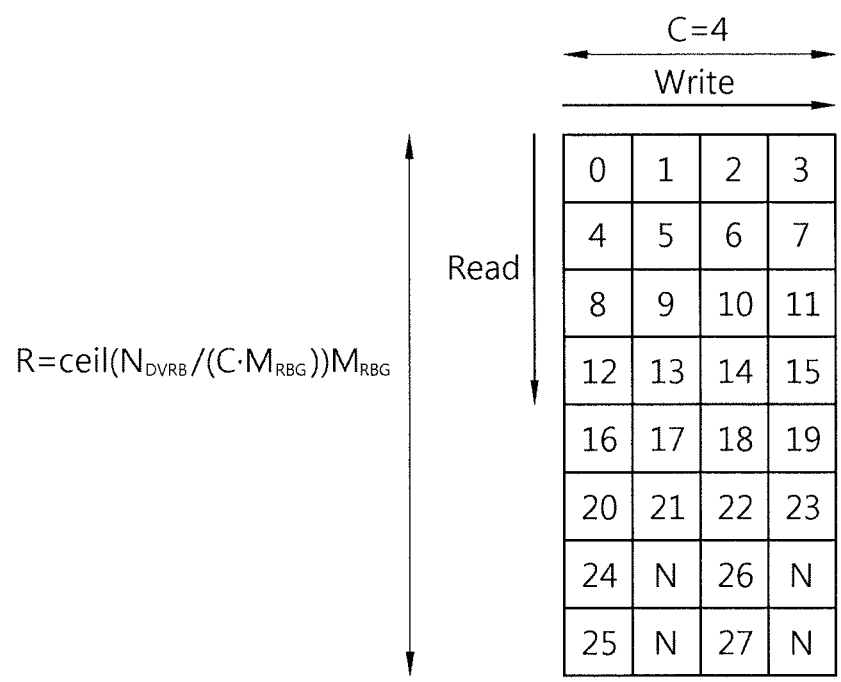
FIG. 9 illustrates an example of an interleaver used in a DVRB allocation method.

FIG. 9 illustrates an example of an interleaver used in the DVRB allocation method.

The interleaver includes 4 columns and $N_{row}$ rows. FIG. 9 illustrates that $N_{row}=8$. In general, $N_{row}=\lceil \tilde{N}_{VRB}^{DL}/(4P) \rceil \cdot P$, and P denotes the RBG size of Table 2. VRB numbers are written in order of row and read in order of columns in an interleaver, such as that of FIG. 9. $N_{null}$ nulls are inserted into the last $N_{null}/2$ rows of the second and the fourth columns of the interleaver. FIG. 9 illustrates a case where $N_{null}=4$. In general, $N_{null}=4N_{row}-\tilde{N}_{VRB}^{DL}$. The nulls are neglected when the VRB numbers are read.

Mapping between VRB numbers and PRB numbers may be derived as in the following equation.

First, an even slot number $n_s$ is derived as in Equation 1.

$$\tilde{n}_{PRB}(n_s) = \begin{cases} \tilde{n}'_{PRB} - N_{row}, & N_{null} \neq 0 \text{ and } \tilde{n}_{VRB} \geq \tilde{N}_{VRB}^{DL} - N_{null} \text{ and } \tilde{n}_{VRB} \bmod 2 = 1 \\ \tilde{n}'_{PRB} - N_{row} + N_{null}/2, & N_{null} \neq 0 \text{ and } \tilde{n}_{VRB} \geq \tilde{N}_{VRB}^{DL} - N_{null} \text{ and } \tilde{n}_{VRB} \bmod 2 = 0 \\ \tilde{n}''_{PRB} - N_{null}/2, & N_{null} \neq 0 \text{ and } \tilde{n}_{VRB} < \tilde{N}_{VRB}^{DL} - N_{null} \text{ and } \tilde{n}_{VRB} \bmod 4 \geq 2 \\ \tilde{n}''_{PRB}, & \text{otherwise} \end{cases} \quad \text{[Equation 1]}$$

In Equation 1, $\tilde{n}'_{PRB}=2N_{row}\cdot(\tilde{n}_{VRB} \bmod 2)+\lfloor \tilde{n}_{VRB}/2 \rfloor + \tilde{N}_{VRB}^{DL}\cdot \lfloor n_{VRB}/\tilde{N}_{VRB}^{DL} \rfloor$, and $\tilde{n}''_{PRB}=N_{row}\cdot(\tilde{n}_{VRB} \bmod 4)+\lfloor \tilde{n}_{VRB}/4 \rfloor + \tilde{n}_{VRB}^{DL}\cdot \lfloor n_{VRB}/\tilde{N}_{VRB}^{DL} \rfloor$. Furthermore, $\tilde{n}_{VRB}=n_{VRB} \bmod \tilde{N}_{VRB}^{DL}$, and $n_{VRB}$ is obtained through downlink scheduling allocation.

An odd slot number $n_s$ is derived as in Equation 2.

$$\tilde{n}_{PRB}(n_s))=(\tilde{n}_{PRB}(n_s-1)+\tilde{N}_{VRB}^{DL}/2) \bmod \tilde{N}_{VRB}^{DL}+\tilde{N}_{VRB}^{DL}\cdot\lfloor n_{VRB}^{DL}/\tilde{N}_{VRB}^{DL} \rfloor \quad \text{[Equation 2]}$$

Equation 1 and Equation 2 are summarized into Equation 3 with respect to all the slot numbers $n_s$.

$$n_{PRB}(n_s) = \quad \text{[Equation 3]}$$
$$\begin{cases} \tilde{n}_{PRB}(n_s), & \tilde{n}_{PRB}(n_s) < \tilde{N}_{VRB}^{DL}/2 \\ \tilde{n}_{PRB}(n_s) + N_{gap} - \tilde{N}_{VRB}^{DL}/2, & \tilde{n}_{PRB}(n_s) \geq \tilde{N}_{VRB}^{DL}/2 \end{cases}$$

Figure 10:
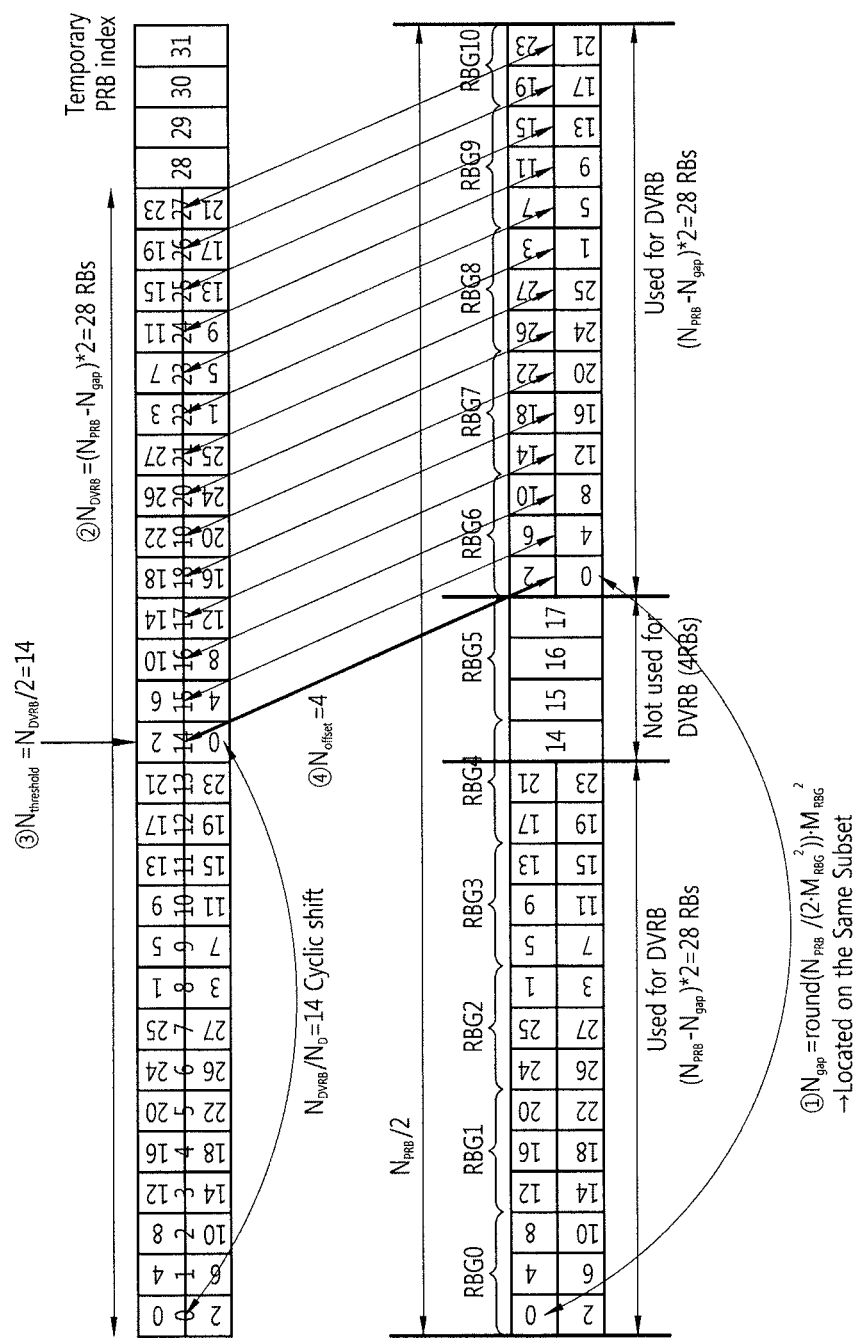
FIG. 10 illustrates a mapping relationship between a DVRB and a PRB according to the DVRB allocation method.

FIG. 10 illustrates a mapping relationship between a DVRB and a PRB according to the DVRB allocation method.

Referring to FIG. 10, the value of $N_{gap}$, that is, the size of a gap, and the value of $M_{RBG}$, that is, an RBG size, are determined by a system band. Accordingly, the size of an interleaver is determined.

Numbers written in each RB of FIG. 10 denote DVRB indices. The DVRB index is interleaved and mapped to a PRB as in FIG. 10. In this case, the value of the interleaver is determined so that contiguous DVRB indices are distributed without corresponding to neighbor PRBs.

Furthermore, a Cyclic Shift (CS) is added to a second slot based on a frequency axis so that the second slot is spaced apart from a first slot and mapped, and the second slot is then mapped. Furthermore, an offset value is added to values corresponding to more than half of a total number of DVRBs so that the values corresponding to more than half of the total number of DVRBs satisfy the $N_{gap}$ conditions, and then the values corresponding to more than half of a total number of DVRBs are mapped.

Such a mapping method is configured so that neighbor DVRB indices are included in the same subset and sequentially fill RBGs by taking into consideration combinations with the bitmaps used in the resource allocation type 0 (the RBG method) and the resource allocation type 1 (the subset method). If 2 DVRBs are allocated to UE through such a process, a diversity dimension is increased to 4 so that a diversity gain is further obtained.

The existing resource allocation method of an RB unit has been described above. It may be seen that in the existing resource allocation method, the gap value $N_{gap}$ and the RBG size $M_{RBG}$ are determined based on the system band $N^{DL}_{RB}$ and the interleaver when DVRBs are allocated is determined as described above.

A resource allocation method and apparatus according to the present invention are described below.

The next-generation wireless communication system, such as LTE-A, may support low-price/low-specification terminals that chiefly perform data communication, such as the metering of a meter, the measurement of a water level, the utilization of a surveillance camera, and a report on the inventory of a vending machine. A low-price/low-specification terminal that chiefly performs communication for a small amount of data as described above is called a Machine Type Communication (MTC) device.

Furthermore, in the next-generation wireless communication system, in order to use frequency resources more efficiently, TDD cells that use an unlicenced band (ULB) or different UL-DL configurations may be aggregated and allocated to a single MS.

Alternatively, cells of different duplex methods may be aggregated. For example, cells using the TDD method and cell using the FDD method may be aggregated and configured for a single MS.

Alternatively, a new type of carrier in which backward compatibility with existing carriers is not considered (this is also called a New Carrier Type (NCT)) may be allocated to UE. The NCT may be solely allocated to UE or may be allocated to UE along with other carriers in a carrier aggregation. UE to which the NCT has been allocated may be, for example, Machine Type Communication (MTC) UE. A new type of carrier having reduced overhead of a control channel preferably may be allocated to such MCT UE. In this case, in order to increase the cell coverage of a control channel, such as a PDCCH or an Enhanced-PDCCH (E-PDCCH), the size of the DCI format may be required to be reduced. In this case, a method that may be used is to reduce a resource allocation field.

To this end, in the present invention, a method of dividing the entire system band into subbands (SB) and performing resource allocation within the subbands is taken into consideration. In this case, the subbands have been divided from the entire system bandwidth (system BW). More specifically, the band of a subband may be said to be a set of contiguous RBs, that is, a multiple of an RBG, or a multiple of the square of an RBG.

As described above, in the conventional resource allocation method, the entire system band was allocated in unit of RBG, or the entire system band was divided into several subsets and was allocated in unit of PRB within a designated subset or contiguous RBs were allocated in the entire system band. In the present invention, a subband is different from a PBG because it is a set of contiguous RBs, that is, a multiple of a RBG or a multiple of the square of an RBG. Furthermore, a subband includes contiguous RBs, whereas a subset is different from a subband in that it is a set of RBGs discontiguously spaced apart from each other. Furthermore, a subband is different compared to the resource allocation method, that is, the compact method, in that the subband is not defined by a specific start point of an RB and the number of RBs in the entire system band, but it is divided into bands of a multiple of an RBG or a multiple of the square of an RBG.

Meanwhile, if a subband is used, how the system band will be divided and allocated to subbands is problematic. For example, it is assumed that a system band is 100 RBs. Such a system band may be simply divided into two subbands. As described above, however, there is a problem in that the use of resources is inefficient because the simple division of the system band is not suitable for an RBG, a subset, a gap configuration, and DVRB mapping defined in an existing system.

Accordingly, in the present invention, if subbands are to be configured by dividing a system band, the system band is divided using a multiple of an RBG or a multiple of the square of an RBG as the band boundary of the subbands.

First, problems occurring when a system band is simply divided and allocated to subbands are described.

Figure 11:
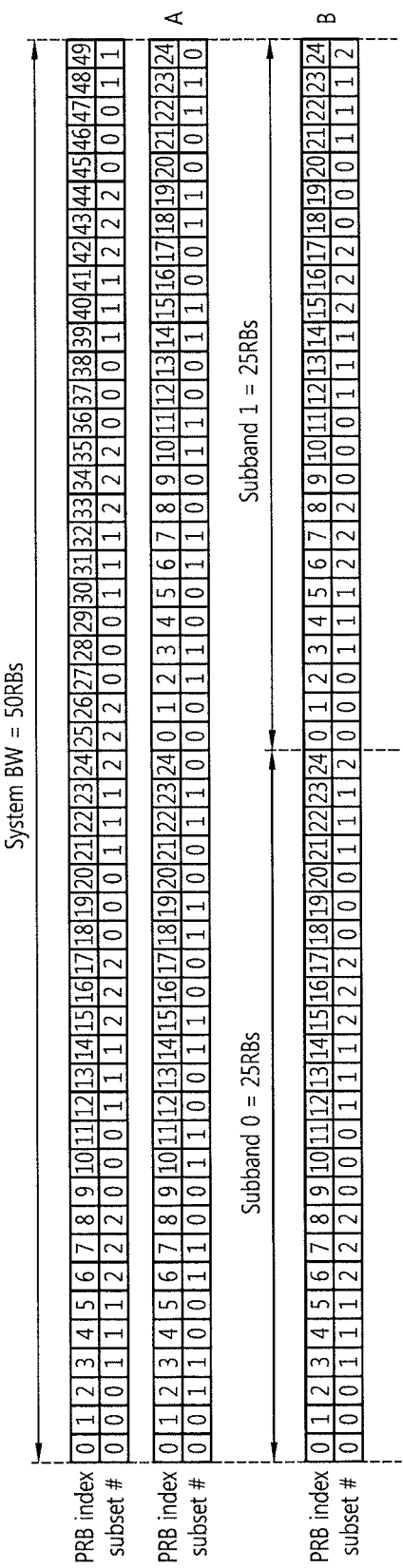
FIG. 11 is an example of a method of dividing a system band into subbands and allocating the subbands.

FIG. 11 is an example of a method of dividing a system band into subbands and allocating the subbands.

Referring to FIG. 11, the system band may include 50 RBs. The 50 RBs may be divided into RBGs each including 3 RBs.

In accordance with A of FIG. 11, if the system band of 50 RBs is to be divided into two subbands 0, 1 each including 25 RBs, the RBG of each subband may include two RBs. That is, if the band of each subband corresponds to 25 RBs, the RBG size (refer to Table 2) when the system band is 25 RBs is applied.

In accordance with B of FIG. 11, if the system band of 50 RBs is to be divided into two subband (subbands 0, 1) each including 25 RBs, the RBG of each subband may include 3 RBs. That is, although the band of each subband is 25 RBs, an RBG size when the system band is 50 RBs is applied.

In the examples of FIG. 11, an RBG size or the boundary of RBGs may not be the same between a case where scheduling is performed on the entire system band (50 RBs) and a case where scheduling is performed on subbands (e.g., bands corresponding to PRB indices 24, 25). As a result, there may be a problem in that it is difficult to use an RBG placed at the boundary of subbands. For example, if existing UE that uses the entire system band and UE that uses subbands are mixed, there are problems in that it is difficult to allocate RBs to the existing UE that uses the entire system band and the UE that uses subbands and use efficiency of the RBs is deteriorated.

Figure 12:
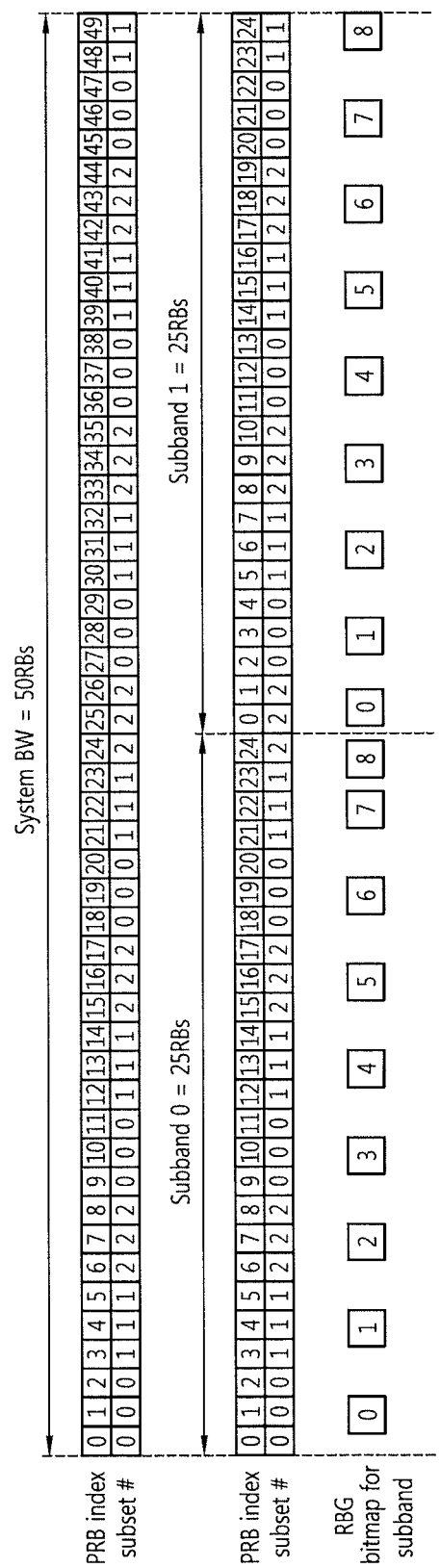
FIG. 12 is another example of a method of simply dividing a system band and allocating the system band as subbands.

FIG. 12 is another example of a method of simply dividing a system band and allocating the system band as subbands.

Referring to FIG. 12, if a system band (50 RBs) is to be divided into two subbands 0, 1, the definition of an RBG and a subset for resource allocation within a subband may be set based on the system band.

A bitmap for the RBG of a subband corresponds to an RBG that belongs to RBGs defined based on the system band (50 RBs) and that is included in the subband.

In B of FIG. 11, an RBG has been configured according to each subband, whereas in FIG. 12, RBGs within a subband are configured in the same manner as that defined in a system band. As a result, in B of FIG. 11, the first 3 RBs are configured as an RBG in the subband 1, whereas in FIG. 12, only the first 2 RBs are configured as an RBG.

UE to which a subband has been allocated may receive information about a system band directly or indirectly and may check the configuration of an RBG and a subset based on the system band using the information. The UE may interpret a bitmap for the RBG of an allocated subband based on the configuration.

Meanwhile, if a plurality of subbands is allocated, the number of RBs that form each subband may be the same or different. If the number of RBs of each subband is different, the size of a bitmap for resource allocation within each subband may be different. If a bitmap is included in DCI and transmitted, this may result in a difference in the size of DCI. In order to prevent the size of DCI from becoming different, a bitmap having the greatest size may be used in a bitmap for all the subbands if the size of a bitmap for allocating resources to each subband is different.

For example, if a bitmap of 12 bits is required for a subband 0 and a bitmap of 15 bits is required for a subband 1, resource allocation within a subband is performed on both the subbands 0, 1 using the bitmap of 15 bits. In this case, the remaining 3 bit of the 15-bit bitmap of the subband 0 may be padded.

FIGS. 11 and 12 illustrate a case where a system band is simply divided and allocated as subbands. Such a method is problematic in that the use of an RBG is inefficient or the start location of an RBG in each subband and the configuration of a bitmap for resource allocation within a subband may be different.

In the present invention, in order to solve the problem, each subband may be allocated as a set of contiguous RBs having bands of a multiple of an RBG or a multiple of the square of an RBG as described above. In accordance with the present invention, use efficiency of frequency resources is increased because an RBG in a subband or part of an RBG subset is not fragmented although the existing resource allocation method (i.e., a resource allocation method based on a system band) is applied.

If a guard band is required between subbands, the subbands band may be configured to include the guard band. Resources within a subband may be allocated using the index of frequency resources other than a guard band, or resources within a subband may be indexed including a guard band and an index corresponding to the guard band may be then excluded.

If a system band is 50 RBs or higher, the second gap Ngap, 2 may be applied. Two sections to which 2 DVRB interleaving blocks are mapped are generated due to the second gap. In the present invention, a subband may be configured to not overlap with the boundary of the two sections. That is, the subband may be divided so that it is included only in a single interleaving block. For example, if the subband is divided in unit of multiples of 2 of the second gap, the subband may not overlap with the boundary of the two sections. Even in uplink, the same subband division scheme as that of downlink may be used.

Figure 13:
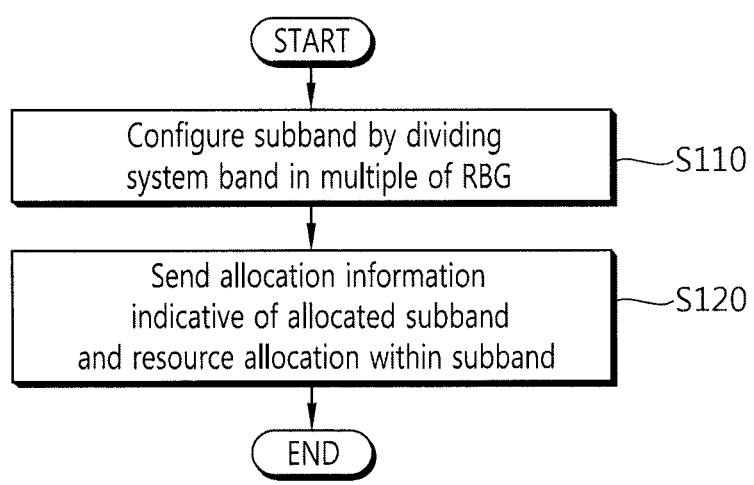
FIG. 13 illustrates a resource allocation method in accordance with an embodiment of the present invention.

FIG. 13 illustrates a resource allocation method in accordance with an embodiment of the present invention.

Referring to FIG. 13, a BS configures a subband by dividing a system band into a multiple of an RBG (S110). That is, the band of the subband may be configured in a multiple of an RBG or a multiple of the square of an RBG. The RBG may be configured as in Table 2 based on the system band.

The BS sends, to UE, allocation information indicative of the allocated subband and resource allocation within the allocated subband (S120). The allocation information may be included in a DCI format and transmitted. The allocation information may include a bitmap for the subband. In the bitmap, resources may be allocated in unit of RB or RBG within the subband.

Since the allocation information is indicative of resource allocation within the subband, the number of bits can be reduced compared to allocation information that is conventionally provided based on a system band. Alternatively, although the same bit is used, resources can be allocated in a further minute unit.

A detailed example in which a system band is divided is described below.

Figure 14:
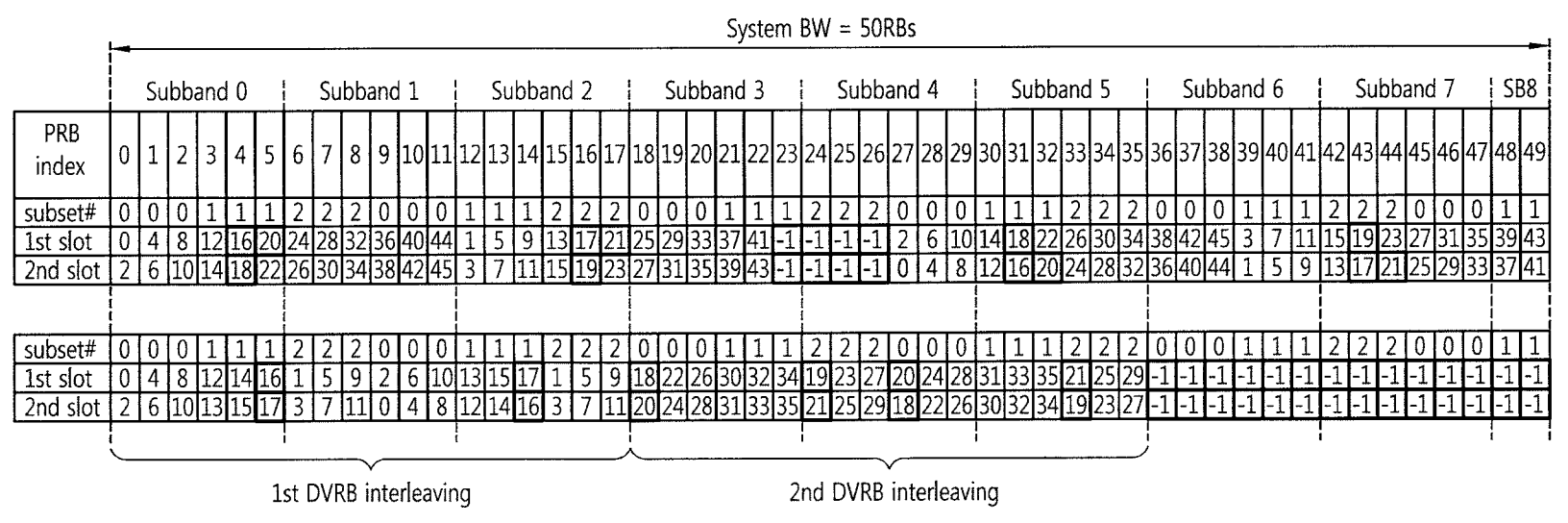

FIG. 14 illustrates an example in which the bands of subbands are allocated in multiples of 2 of an RBG size.

Referring to FIG. 14, a system band is 50 RBs. In this case, an RBG size based on the system band is 3 RBs. In this case, each subband may be allocated as 6 RBs, that is, twice the RBG size. In this case, an RBG that overlaps with the boundary of two subbands is not generated.

If a DVRB is used, DVRB interleaving may be performed based on 3 subbands (e.g., subbands 0-2 and subbands 3-5). An RB indicated by "−1" denotes an RB to which a DVRB has not been mapped (the same as above).

Figure 15:
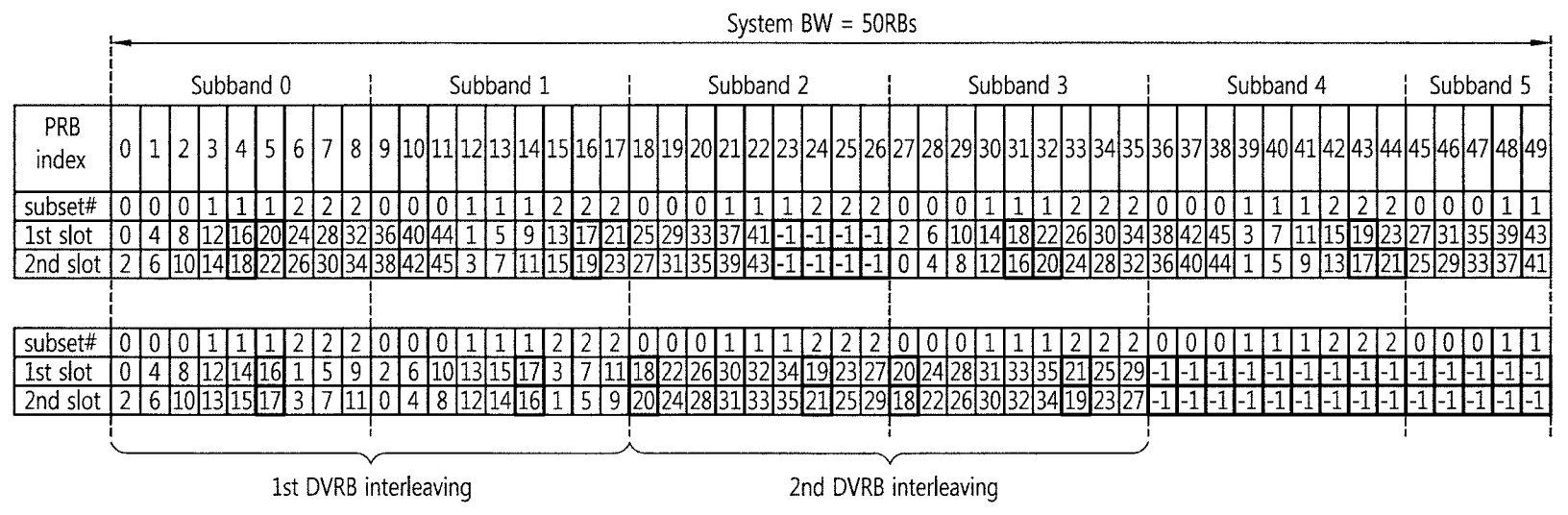

FIG. 15 illustrates an example in which the bands of subbands are allocated in the square of an RBG size.

Referring to FIG. 15, a system band is 50 RBs. In this case, the RBG size is 3 RBs. In this case, each subband may be allocated as 9 RBs, that is, the square of the RBG size. In this case, an RBG that overlaps with the boundary of two subbands is not generated.

Since the value of a gap consists of a multiple of the square of an RBG, the complexity of scheduling can be reduced because the location of a PRB is identical with a location on a subband when a DVRB is configured in the system band.

Figure 16:
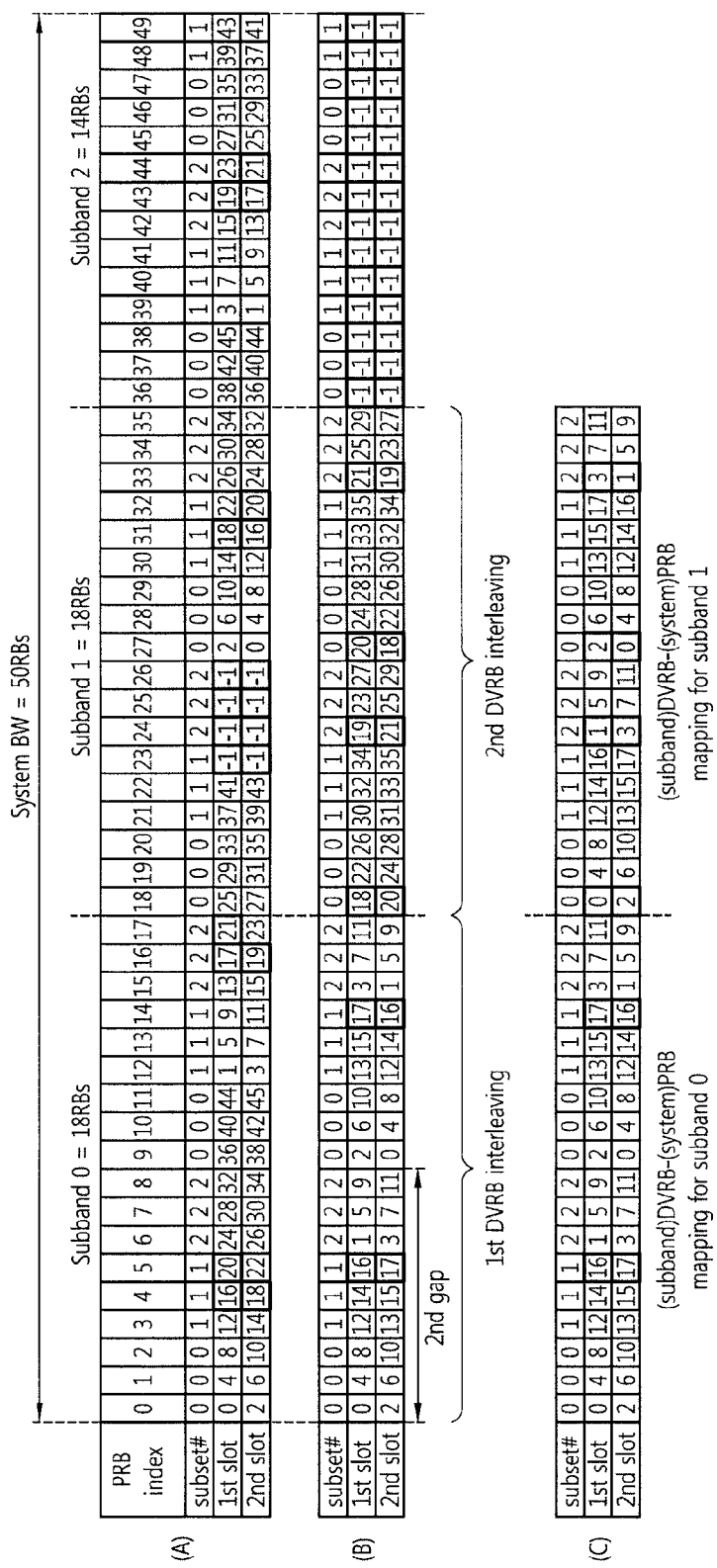
FIG. 16 illustrates an example in which the bands of subbands are allocated in a DVRB interleaver unit.

FIG. 16 illustrates an example in which the bands of subbands are allocated in a DVRB interleaver unit.

Referring to FIG. 16(A), if a second gap Ngap, 2 is applied, the bands of subbands may be configured in a DVRB interleaver unit (i.e., a multiple of the second gap). In this case, the DVRB-PRB mapping pattern of a system band (FIG. 16 (B)) is matched with the DVRB-PRB mapping pattern (FIG. 16 (C)) of a subband. That is, DVRB indices in a subband 0 are the same as those in the system band, and DVRB indices in a subband 1 are the same as those in the system band. For example, a DVRB index 18 in a subband 1 of FIG. 16 (B) corresponds to a DVRB index 0 in a subband 1 of FIG. 16(C). A DVRB index 20 in the subband 1 of FIG. 16 (B) corresponds to a DVRB index 2 in the subband 1 of FIG. 16(C). That is, a DVRB pattern of UE to which the subbands 0, 1 have been allocated may use the $1^{ST}$ DVRB interleaving pattern based on the system band.

If the bands of subbands are allocated in a DVRB interleaver unit as in FIG. 16, UE may configure configurations, such as an RBG size and a gap applied to a subband, like configurations, such as the RBG size and gap of a system band.

FIG. 17 illustrates an example in which the bands of subbands are allocated based on the first gap Ngap, 1.

Referring to FIG. 17, in the state in which the indices of DVRBs have been determined in accordance with a DVRB-PRB mapping method if a system band is 50 RBs, a subband 0 may include regions in which a DVRB has not been mapped to a PRB (e.g., PRB indices 23-26) or may not include such regions. A subband 1 may include PRB indices 27-49.

Figure 18:
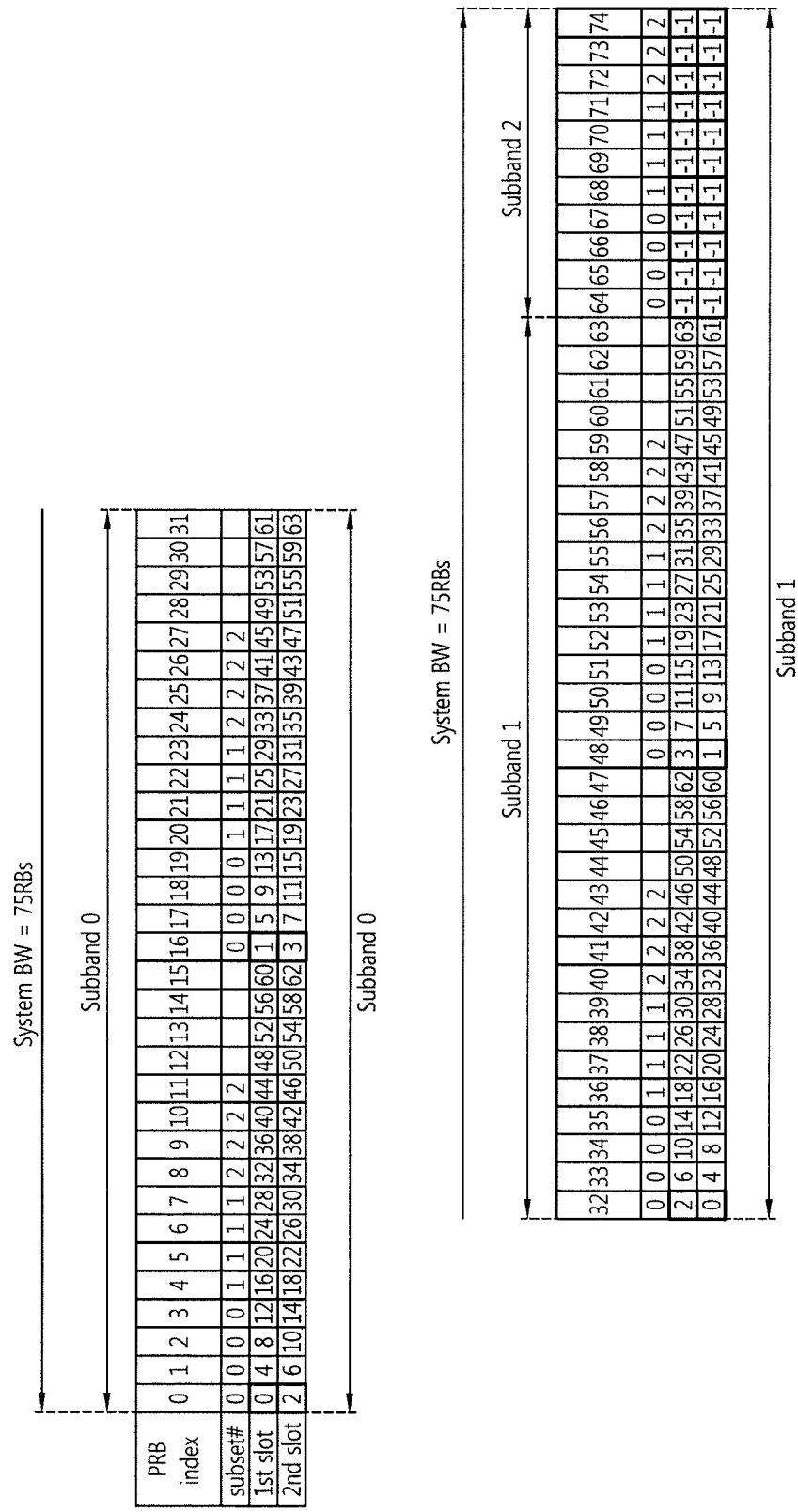
FIG. 18 illustrates another example in which the bands of subbands are allocated based on a first gap Ngap, 1.

FIG. 18 illustrates another example in which the bands of subbands are allocated based on a first gap Ngap, 1.

In FIG. 18, unlike in FIG. 17, regions in which a DVRB has not been mapped to a PRB (e.g., PRB indices 64-74) are present in the last PRBs of a system band. In such a case, a subband 0 may be configured as in PRB indices 0-31, a subband 1 may be configured as in PRB indices 32-63, and a subband 2 may be configured as in PRB indices 64-74. Alternatively, the subband 0 may be configured as in the PRB indices 0-31, and the subband 1 may be configured as in PRB indices 32-75.

Figure 19:
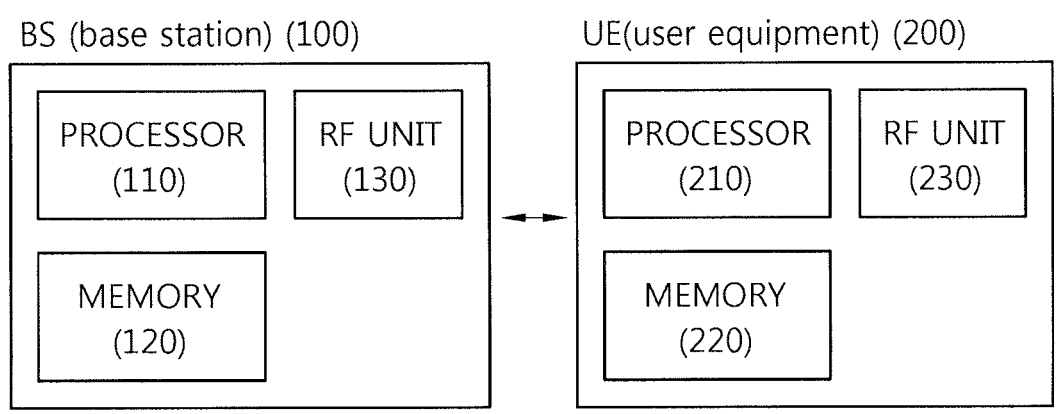
FIG. 19 illustrates the configuration of a BS and UE in accordance with an embodiment of the present invention.

FIG. 19 illustrates the configuration of a BS and UE in accordance with an embodiment of the present invention.

The BS 100 includes a processor 110, memory 120, and a Radio Frequency (RF) unit 130. The processor 110 implements the proposed functions, processes and/or methods. For example, the processor 110 configures subbands by dividing a system band in a multiple of a Resource Block Group (RBG) or a multiple of the square of an RBG, and sends allocation information indicative of a subband that belongs to the subbands and that is allocated and resource allocation within the subband. The memory 120 is connected to the processor 110 and stores various types of information for driving the processor 110. The RF unit 130 is connected to the processor 110 and sends and/or receives radio signals.

The UE 200 includes a processor 210, memory 220, and an RF unit 230. The processor 210 implements the proposed functions, processes and/or methods. For example, the processor 210 receives allocation information, included in DCI, from a BS. The allocation information may include a subband configured for the UE and resource allocation within the subband. The memory 220 is connected to the processor 210 and stores various types of information for driving the processor 210. The RF unit 230 is connected to the processor 210 and sends and/or receives radio signals.

The processor 110, 210 may include Application-Specific Integrated Circuits (ASICs), other chipsets, logic circuits, data processors and/or converters for baseband signals and radio signals and vice versa. The memory 120, 220 may include Read-Only Memory (ROM), Random Access Memory (RAM), flash memory, memory cards, storage media and/or other storage devices. The RF unit 130, 230 may include one or more antennas for sending and/or receiving radio signals. When an embodiment is implemented in software, the aforementioned scheme may be implemented using a module (process or function) that performs the aforementioned function. The module may be stored in the memory 120, 220 and executed by the processor 110, 210. The memory 120, 220 may be disposed to the processor 110, 210 internally or externally and connected to the processor 110, 210 using a variety of well-known means.

What is claimed is:

1. A method of allocating radio resources in a wireless communication system, the method comprising:
configuring one or more subbands by dividing a system band,
wherein each of the one or more subbands consists of N Physical Resource Blocks (PRBs), where N is a natural number larger than 1,
wherein if one Resource Block Group (RBG) consists of M PRBs, N is determined as a multiple of a square of M, where M is a natural number larger than 1,
wherein the N PRBs included in each of the one or more subbands are contiguous in a frequency domain,
wherein a gap is applied to the system band when the system band has 50 PRBs or higher, and
wherein when the gap is applied to the system band, the system band is divided such that all of the one or more subbands are included only in a single interleaving block; and
sending allocation information indicative of resource allocation within the configured one or more subbands.

2. The method of claim 1, wherein the allocation information comprises a bitmap indicative of resources allocated in a resource block unit or an RBG unit within the configured one or more subbands.

3. The method of claim 1, wherein the RBG comprises 2, 3, or 4 contiguous resource blocks based on the system band.

4. The method of claim 1, wherein the allocation information indicative of resource allocation within the configured one or more subbands comprises an identical number of bits.

5. The method of claim 4, wherein the allocation information has a size identical with a size of allocation information required for a subband that belongs to the one of more subbands and that comprises a greatest number of resource blocks.

6. The method of claim 1, wherein the allocation information is included in Downlink Control Information (DCI) transmitted through a physical downlink control channel (PDCCH) and transmitted.

7. An apparatus for allocating radio resources, the apparatus comprising:
- a Radio Frequency (RF) unit configured to send and receive radio signals; and
- a processor connected to the RF unit,
- wherein the processor is configured to:
  - configure one or more subbands by dividing a system band, and
  - send allocation information indicative of resource allocation within the configured one or more subbands,
- wherein each of the one or more subbands consists of N Physical Resource Blocks (PRBs), where N is a natural number larger than 1,
- wherein if one Resource Block Group (RBG) consists of M PRBs, N is determined as a multiple of a square of M, where M is a natural number larger than 1,
- wherein the N PRBs included in each of the one or more subbands are contiguous in a frequency domain,
- wherein a gap is applied to the system band when the system band has 50 PRBs or higher, and
- wherein when the gap is applied to the system band, the system band is divided such that all of the one or more subbands are included only in a single interleaving block.

* * * * *